Aug. 14, 1956  W. L. WILSON  2,758,401
VEHICLE SIGNALS
Filed March 9, 1953  2 Sheets-Sheet 1
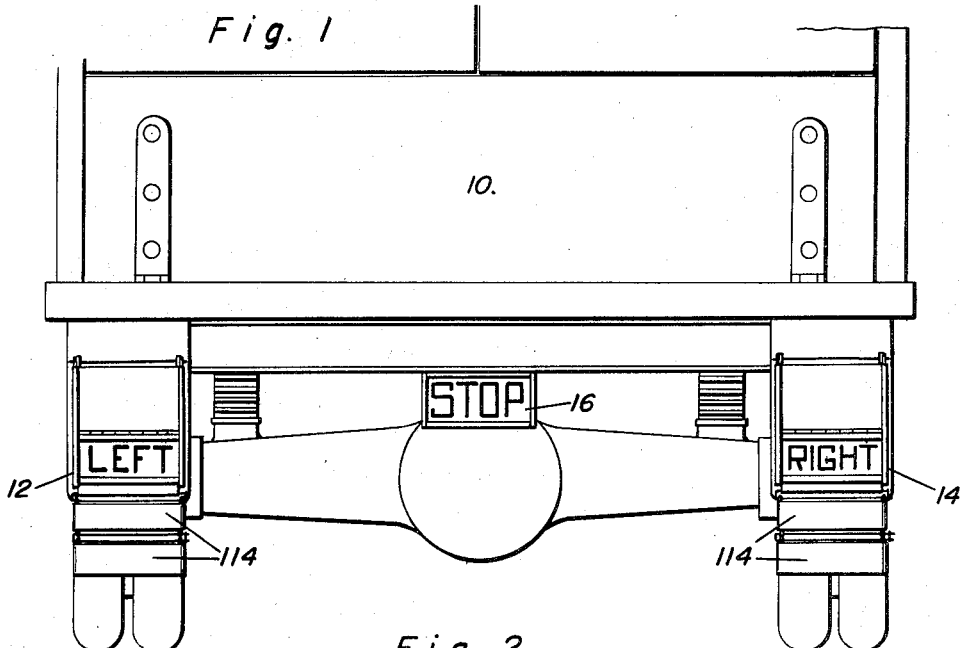
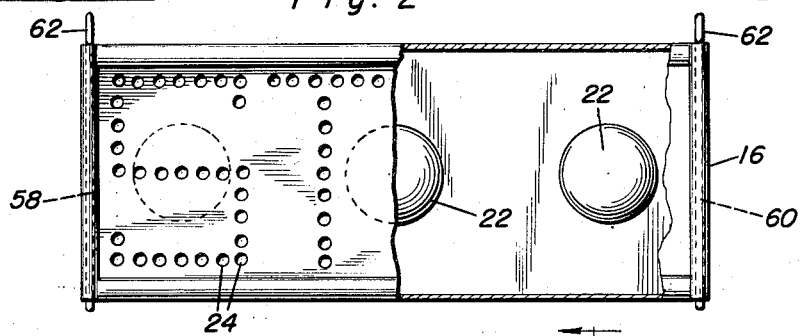
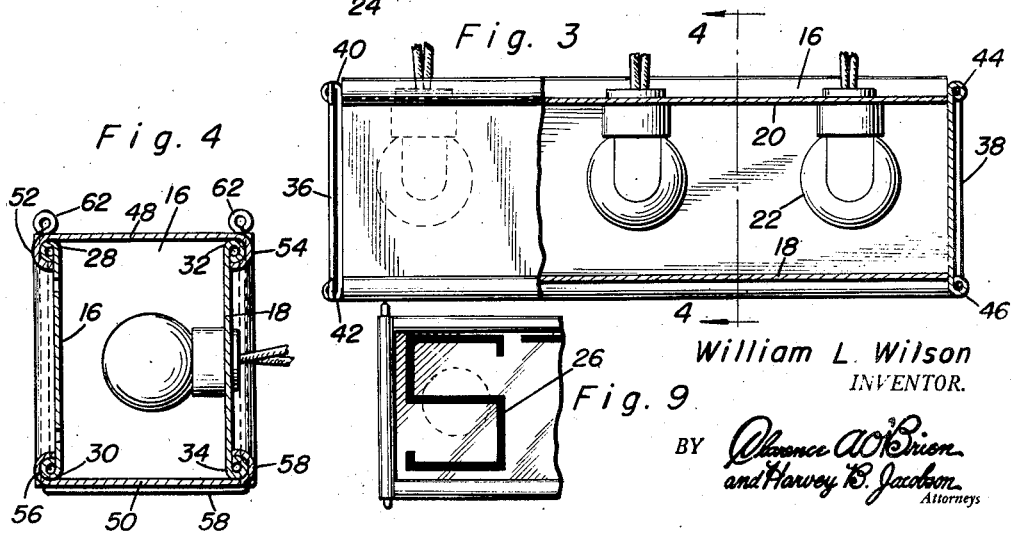
William L. Wilson
INVENTOR.

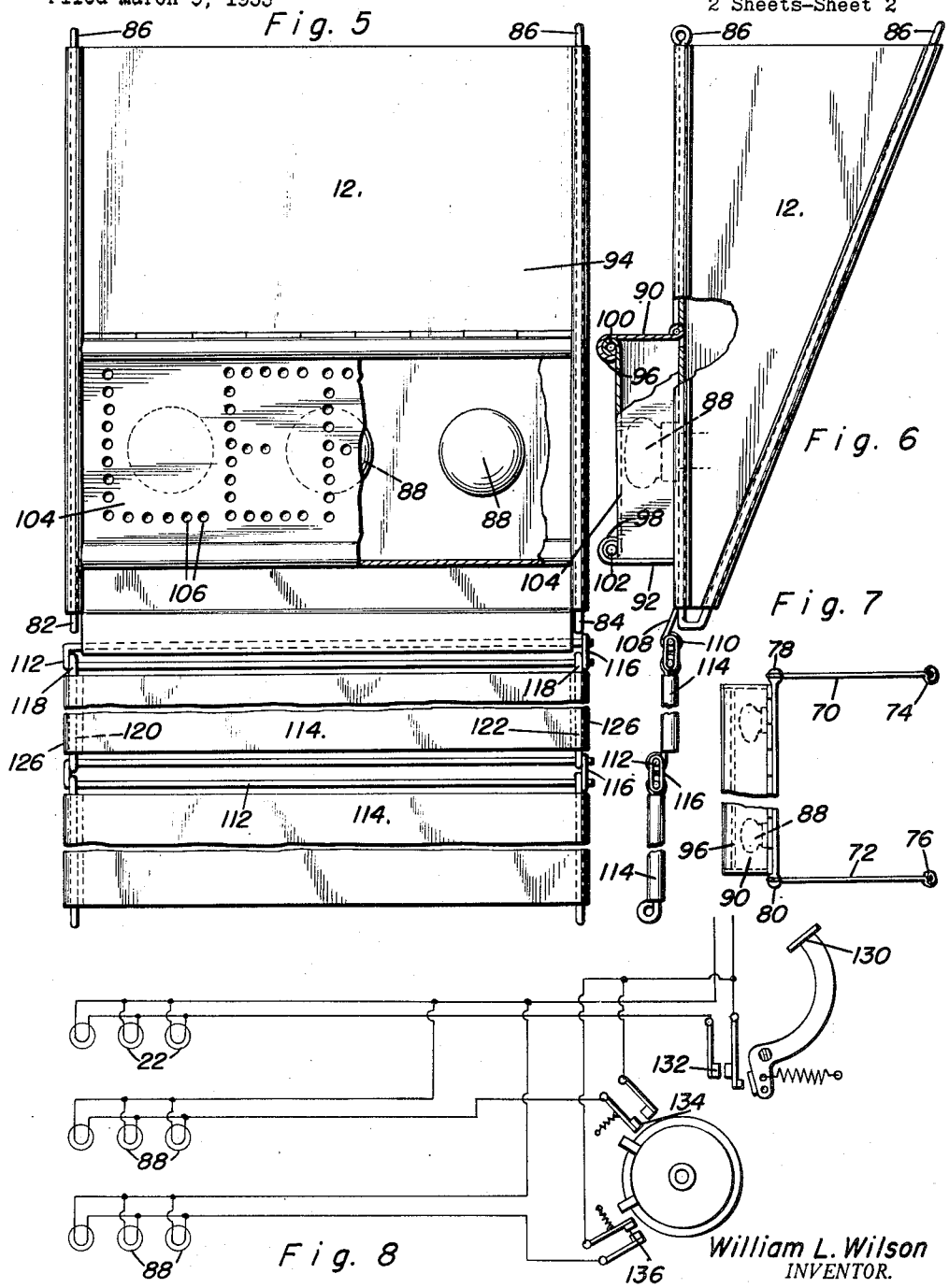

United States Patent Office 2,758,401
Patented Aug. 14, 1956

2,758,401

VEHICLE SIGNALS

William L. Wilson, Tiffin, Ohio

Application March 9, 1953, Serial No. 341,120

2 Claims. (Cl. 40—129)

This invention relates to signals adapted to be attached to vehicles and more particularly to brake actuated warning signals and to combined turn indicators and mud guards.

The primary object of this invention resides in the provision of vehicle signals which will enable large vehicles such as trailers of tractor-trailer combinations and the like to have installed thereon at a minimum of cost means to indicate the direction in which it is intended to turn the vehicle and to indicate that the brake pedal of the vehicle is being applied.

Another important object of this invention resides in the provision of turn indicator signals which may be installed in a simple and convenient manner on a trailer vehicle in association with the rear fenders thereof, the turning indicators having pivotally attached thereto suitable deflecting plates capable of acting as mud guards.

Still further objects of the invention reside in the provision of vehicle signals that are strong and durable, capable of being simple and easily attached to a vehicle, which are capable of being actuated by conventional means and which can be manufactured at a relatively low cost out of various materials.

These, together with the various ancillary objects and features of the invention which will become apparent as the following description proceeds, are attained by these vehicle signals, preferred embodiments of which have been illustrated in the accompanying drawings, by way of example only, wherein:

Figure 1 is a rear elevational view of a trailer vehicle provided with the stop signal and the left and right turn signals comprising the present invention;

Figure 2 is an elevational view of the brake actuated stop signal device;

Figure 3 is a top plan view of the stop signal with parts thereof being broken away to show other parts thereof in section;

Figure 4 is a vertical sectional view as taken along the plane of line 4—4 in Figure 3;

Figure 5 is an elevational view illustrating one of the combined turn signals and mud guard;

Figure 6 is a side elevational view of the combined turn signal and mud guard with parts thereof being shown in section for greatest detail;

Figure 7 is a top plan view of the turn signals;

Figure 8 is a wiring diagram of the signal circuit employed by the trailer having the turn indicators and the stop signal installed thereon; and, Figure 9 is an elevation detail showing a modified form of light transmitting means which may be used alternatively with the means employed by the signal devices illustrated in the previous figures.

With continuing reference to the accompanying drawings wherein like reference numerals designate similar parts throughout the various views, reference numeral 10 generally designates a trailer of a tractor-trailer combination which employs the left and right turn indicator signals designated 12 and 14 respectively and the brake actuated stop signal 16. With reference to the brake actuated stop signal as is shown in Figures 2-4 in particular, it will be noted that the stop signal is provided with front and rear walls 18 and 20. Suitable light sources which may comprise electric lamps 22 are carried by the rear wall 20 within the casing of the signal 16. The front wall 18 is provided with a series of perforations as at 24 providing means through which rays emanating from the lamps 22 can pass. Alternatively, a lens of glass or plastic indicating suitable indicia as is shown in Figure 9 by reference numeral 26 may be provided in lieu of the perforations or apertures 24. It is to be noted that the front and rear walls 16 and 18 respectively are provided at their upper and lower edges with cylindrical beads 28, 30, 32 and 34. Furthermore, the side walls 36 and 38 of the stop sign 16 are provided with hollow cylindrical beads 40, 42, 44 and 46. The top wall 48 and a bottom 50 are slidably secured over the beads 28, 30, 32 and 34, the top wall 48 being provided with cylindrical portions 52 and 54 embracing the beads 28 and 32 and the bottom wall 50 being provided with cylindrical portions 56 and 58 embracing the beads 30 and 34. The brake actuated stop sign 16 is secured on the truck by means of rods 58 and 60 which are substantially U-shaped in configuration and which terminate in eyes 62 at the upper edges thereof, fasteners extending through the eyes 62 being used to secure the device to the vehicle 10.

The turn indicators as illustrated in Figures 5-7 are similar in construction to the stop signals and are provided with rear walls. However, the turn indicators are provided with side walls 70 and 72, the rear edges thereof being provided with cylindrical beads 74 and 76 configurated to conform with the contours of the rear fender of the vehicle to which the device is to be attached. The front edges of the side walls 70 and 72 are likewise provided with cylindrical beads 78 and 80 and substantially V-shaped rods 82 and 84 extend upwardly through the hollow beads 74, 76, 78 and 80 and terminate in eyes 86 which are formed for suspending the turn indicators from the vehicle 10. Suitable electric lamps 88 are mounted within the casings of these turn indicators and extensions 90 and 92 extend outwardly from the front wall 94 of the turn indicators, the extensions 90 and 92 terminating in cylindrical portions 96 and 98, respectively, which are adapted to receive the cylindrical beads 100 and 102 formed on the upper and lower edges of the indicator plate 104 provided with perforations 106 through which the light rays emanating from the bulbs 88 can pass.

A plate 108 depends from the front wall 94 and may be formed integrally therewith. The bottom edge of the plate 108 terminates in a hollow bead 110 through which a U-shaped rod 112 extends, the rod 112 being adapted to support a deflector plate 114 for pivotal movement. The end of the U-shaped rod 112 is closed by means of a beveled shaped clamping ring 116. The rod 112 extends through eyes 118 formed on rods 120 and 122 extending through beads 124 and 126 on the vertical side edges of the deflector plate 114.

In order to compensate for the varying heights that the turn indicator signals 12 and 14 may be installed on different vehicles any number of deflector plates 114 can be installed using U-shaped rods 112 and locking rings 116.

As is shown in Figure 8, the electric lamps 22 of the stop sign can be electrically operatively connected to a source of power by means of a brake pedal 130 actuated switch 132 as is now conventionally used. Likewise, the turn indicator lamps 88 may be connected through pairs of contacts 134 and 136 actuated by a conventional turn indicator lever to the source of power.

Since from the foregoing, the construction and advantages of these vehicle signals are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. Vehicle signal apparatus comprising a casing, said casing having a front wall, a light source in said casing, said front wall of said casing having portions thereof configurated to conform to a selected indicia permitting passage of light rays therethrough, the vertical edges of said casing being provided with hollow beads at the front and rear thereof, and a pair of rods, each of said rods having a portion thereof extending through a bead at the front of said casing and a bead at the rear of said casing, eyes on the upper ends of said rods providing means for securing said casing on a vehicle, a plate depending from said front wall having a bead thereon, and at least one plate providing means for deflecting mud pivotally depending from said bead on said plate.

2. Vehicle signal apparatus comprising a casing, a light source in said casing, the front wall of said casing having portions thereof configurated to conform to a selected indicia permitting passage of light rays therethrough, the vertical edges of said casing being provided with hollow beads at the front and rear thereof, and a pair of rods, each of said rods having a portion thereof extending through a bead at the front of said casing and a bead at the rear of said casing, eyes on the upper ends of said rods providing means for securing said casing on a vehicle, the rear edges of the side walls of said casing being configurated to conform with and overlie a rear fender of a vehicle.

References Cited in the file of this patent

UNITED STATES PATENTS

| | | |
|---|---|---|
| 677,176 | Cochran | June 25, 1901 |
| 738,443 | Henshaw | Sept. 8, 1903 |
| 797,492 | Butters | Aug. 15, 1905 |
| 887,408 | Mason | May 12, 1908 |
| 962,724 | Smith | June 28, 1910 |
| 1,414,948 | Hagen | May 2, 1922 |
| 1,484,789 | Lackey | Feb. 26, 1924 |
| 1,607,923 | Schell | Nov. 3, 1926 |
| 2,078,894 | Haines | Apr. 27, 1937 |
| 2,546,781 | Rheeling | Mar. 27, 1951 |